United States Patent [19]
Yoshino

[11] 4,134,656
[45] Jan. 16, 1979

[54] MEANS FOR TRANSMITTING INFORMATION FROM LENS BARREL TO CAMERA BODY

[75] Inventor: Takeshi Yoshino, Omiya, Japan

[73] Assignee: Fuji Photo Optical Co., Ltd., Omiya, Japan

[21] Appl. No.: 835,740

[22] Filed: Sep. 22, 1977

[30] Foreign Application Priority Data

Sep. 22, 1976 [JP] Japan ................. 51-128046[U]

[51] Int. Cl.² .............. G03B 13/20; G03B 13/02
[52] U.S. Cl. .............................. 354/163; 354/219
[58] Field of Search .......... 354/162, 163, 219, 221, 354/166, 168, 169, 199, 200, 201; 352/139

[56] References Cited
U.S. PATENT DOCUMENTS

| | | | |
|---|---|---|---|
| 2,065,335 | 12/1936 | Küppenbender | 354/169 |
| 2,423,967 | 7/1947 | Dalotel | 354/201 X |
| 3,382,786 | 5/1968 | Weidner et al. | 354/162 |

FOREIGN PATENT DOCUMENTS

| | | | |
|---|---|---|---|
| 177999 | 3/1954 | Austria | 354/163 |
| 566595 | 11/1958 | Canada | 354/163 |
| 1005366 | 3/1957 | Fed. Rep. of Germany | 354/162 |
| 892373 | 1/1944 | France | 354/221 |

Primary Examiner—Donald A. Griffin

[57] ABSTRACT

In a collapsible mount type camera, a transmission pin provided in a lens barrel is movable back and forth as a distance ring or aperture size control ring is rotated. The rear end of the transmission pin is projected rearward out of the lens barrel. The rear end of the pin is integrally fixed to a radially extending lever which extends beyond the periphery of the lens barrel. On the outer end of the radially extending lever abuts a rear end of an intermediate lever pivotally mounted in a camera body. When the lens barrel is retracted into the camera body, the lens barrel with the transmission pin is not obstructed by the intermediate lever.

5 Claims, 2 Drawing Figures

MEANS FOR TRANSMITTING INFORMATION FROM LENS BARREL TO CAMERA BODY

BACKGROUND OF THE INVENTION

1. Field of the Invention

This invention relates to a means for transmitting information from a lens barrel to a camera body in a collapsible mount type camera, and more particularly to a mechanical means provided in a lens barrel of a collapsible mount type camera for transmitting distance or aperture size information in the lens barrel to a range finder or an exposure control means in the camera body.

2. Description of the Prior Art

Between a lens barrel and a camera body, various kinds of information such as a distance of the object to be photographed or an aperture size of the diaphragm of the taking lens are transmitted via a mechanical transmitting device. For instance, the distance information is transmitted from a distance ring of the lens barrel to a range finder in the camera body. Further, the aperture size information is transmitted from an aperture control ring of the lens barrel to an exposure control device in the camera body. In a camera provided with a flash-matic device in which a diaphragm is controlled of its aperture size in accordance with the distance of the object for controlling exposure under flash light illumination, the distance information is transmitted from a distance ring of the lens barrel to the flash-matic device in the camera body.

In order to transmit the information from the lens barrel to the camera body, the conventional cameras are provided with a transmission pin projected rearward from the lens barrel. The transmission pin is connected with a distance ring or an aperture control ring of the lens barrel and the rear end of the pin is engaged with an intermediate lever of the camera body connected with a range finder or an exposure control device in the camera body. The transmission pin is moved back and forth in the axial direction of the lens barrel as the distance or aperture control ring is rotated.

The above described transmission pin has a defect in that the collapsible mount type camera cannot use this type of transmission pin. This is because the transmission pin is projected rearward and an end of the intermediate lever of the camera is engaged with the rear end of the pin, and accordingly, the lens barrel cannot be pushed into the camera body.

SUMMARY OF THE INVENTION

The primary object of the present invention is to provide an information transmission means which transmits information from a lens barrel to a camera body in a collapsible mount type camera.

The above object of the present invention is accomplished by extending the rear end of the transmission pin radially outward beyond the periphery of the lens barrel and making an end of an intermediate lever in the camera body engaged with the radially extending rear end of the pin from the front so that the pin can be moved rearward together with the lens barrel when the lens barrel is pushed into the camera body. When the lens barrel is deeply pushed into the camera body, the radially extending rear end of the pin is separated from the intermediate lever of the camera. Therefore, the intermediate lever does not obstruct the rearward movement of the lens barrel.

DESCRIPTION OF THE PREFERRED EMBODIMENT

Figure 1:
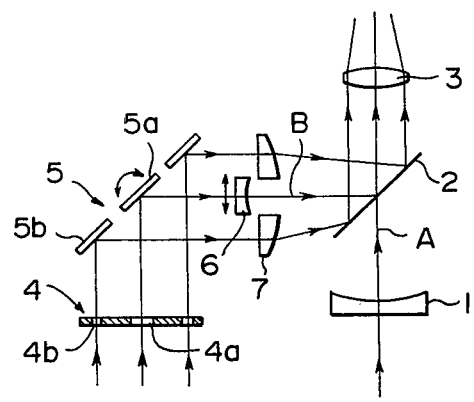
FIG. 1 is a diagram showing an optical system of a range finder of a camera to which the information transmitting device in accordance with this invention is applicable.

FIG. 1 shows a known inverted Galilean finder consisting of an objective 1, a half-transparent mirror 2 and an eyepiece 3 arranged along a first optical axis A. A virtual image formed by the objective 1 is viewed through the half-transparent mirror 2 and the eyepiece 3. A frame mask 4 having a central aperture 4a for defining an area for focus adjustment and a bright frame 4b is provided in parallel with the objective 1 and the light passing through the frame mask 4 is reflected by a mirror group 5 consisting of a central rotatable mirror 5a and a fixed annular mirror 5b toward the half-transparent mirror 2. Between the mirror 2 and the mirror group 5 are provided a lens system consisting of an objective 6 for a range finder and an annular convex lens 7. The objective 6 is located on an optical axis B of the lens system. The optical axis B is aligned with the optical axis A on the half-transparent mirror 2.

The light passing through the central aperture 4a of the frame mask 4 is reflected by the rotatable mirror 5a and passes through the objective 6 and reflected toward the eyepiece by the mirror 2. The light passing through the bright frame 4b of the frame mask 4 is reflected by the mirror 5b and passed through the annular lens 7 and reflected toward the eyepiece 3 by the mirror 2. Thus, the image viewed through the objective 1 of the inverted Galilean finder is superimposed with the image of the bright frame 4b and the image of the object defined by the central aperture 4a of the frame mask 4. The rotatable mirror 5a is rotated to vary the direction of reflection thereby in accordance with the distance of the object. By precisely superimposing the image viewed through the central aperture 4a with the image viewed through the objective 1, the focus of a taking lens of the camera is adjusted. Instead of rotating the mirror 5a, the objective 6 may be moved in the direction perpendicular to the optical axis B as shown in FIG. 1 with an arrow. In this case, the mirror 5a is not rotated.

Figure 2:
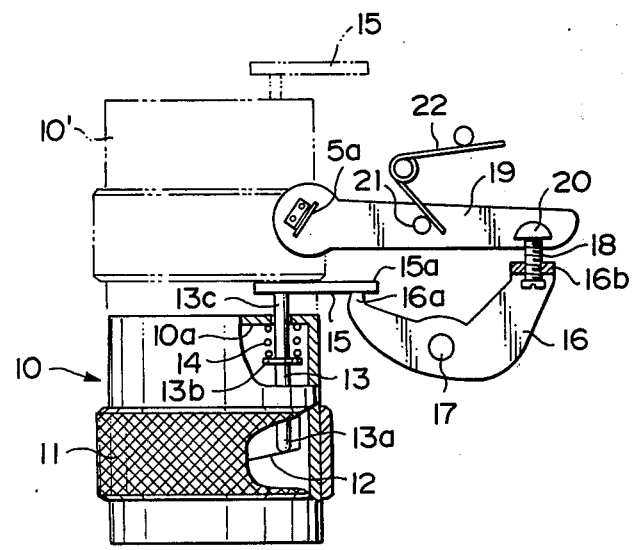
FIG. 2 is a partly cut away plan view showing a lens barrel of a collapsible mount type camera provided with an information transmitting device in accordance with an embodiment of the present invention.

FIG. 2 shows a mechanism for rotating the mirror 5a in accordance with the distance of the object. The distance information is given by a distance ring 11 rotatably mounted on a lens barrel 10. The lens barrel 10 is of a collapsible mount type camera and is movable up to the position as shown with chain lines 10' in FIG. 2 which is in a camera body (not shown). When a picture is to be taken, the lens barrel 10 is brought to the position shown with solid lines. By rotating the distance ring 11, the taking lens (not shown) in the lens barrel 10 is moved back and forth for adjusting focus. The distance ring 11 is provided with a cam 12 on which a front end 13a of a transmission pin 13 abuts. The transmission pin 13 is movable back and forth along the optical axis of the taking lens and is spring urged forward by a compression spring 14 which is interposed between a flange 13b of the pin 13 and a rear end wall 10a of the lens barrel 10. The rear end 13c of the transmission pin 13 is projected rearward out of the rear end wall 10a of the lens barrel 10 and is connected integrally with a radially extending lever 15. The lever 15 extends radially outward from the rear end 13c of the transmission pin 13 and the outer end 15a of the lever 15 is beyond the periphery of the lens barrel 10.

The front face of the outer end 15a of the lever 15 is in abutting engagement with an end of an intermediate lever 16 which is rotatably mounted on a pivot 17. The lever 15 is separated from the intermediate lever 16 when the lens barrel 10 is moved to the depressed or retracted position shown with the chain lines 10'. The intermediate lever 16 has an upright bent portion 16b in which a screw member 18 is screwed. The screw member 18 projects its rear end out of the bent portion 16b and the projected rear end thereof abuts on a projection 20 fixed on an end of a mirror holding lever 19. The mirror holding lever 19 is rotatably mounted on a pivot (not shown) located beneath the mirror 5a fixedly mounted thereon. The mirror 5a is fixedly mounted on the other end of the mirror holding lever 19 and is rotated as the lever 19 rotates about said pivot (not shown). The lever 19 has a pin 21 fixed thereon and a spring 22 is engaged therewith to spring urge the lever 19 in the clockwise direction so that the rear end of said screw member 18 is in contact with the projection 20.

In operation, when the distance ring 11 of the lens barrel 10 is rotated the transmission pin 13 is moved back and forth by the cam 12 provided on the distance ring 11. As the transmission pin 13 moves back and forth overcoming or following the compression of the spring 14, the lever 15 fixed to the rear end 13c of the pin 13 is moved back and forth. Accordingly, the intermediate lever 16 is rotated. As the intermediate lever 16 rotates about its pivot 17, the rear end of the screw member 18 pushes rearward the projection 20 of the mirror holding lever 19 or allows the clockwise swing of the lever 19. Thus, the mirror 5a is rotated as the distance ring 11 is rotated. When the lens barrel 10 is pushed into the camera body (not shown) up to the position of the chain line, the lever 15 is separated from the lever 16. In the course of the rearward movement of the lens barrel 10, the lens barrel 10 is not obstructed by the intermediate lever 16 or any other mechanism related therewith. The relative position of the distance ring 11 and the mirror 5a is adjusted by the screw member 18 so that the image viewed via the mirror 5a is superposed with the image viewed through the finder when the position of the taking lens is at the best focussing position.

As mentioned hereinbefore, said objective 6 on the optical axis B can be moved laterally as the transmission pin 13 is moved back and forth. Further, it is also possible to transmit the movement of the transmission pin to a flash-matic mechanism in the camera so that the aperture size of a diaphragm of the flash-matic mechanism is controlled in accordance with the distance.

I claim:

1. A means for transmitting information from a lens barrel to a camera body in a collapsible mount type camera, said means comprising an axially movable pin which is connected with an operating member in the lens barrel and is moved axially by a distance corresponding to the information input by said operating member, said axially movable pin having a rear end projecting rearward out of the lens barrel, and an intermediate member provided in the camera body which is in abutting engagement with the rear end of said pin for transmitting the axial movement of said pin to a mechanism in the camera body, wherein the improvement comprises a radially extending lever fixed to the rear end of said pin, said radially extending lever extending beyond the periphery of said lens barrel, said intermediate member abutting on the front face of said radially extending lever outside the lens barrel, whereby the lens barrel is retracted into the camera body together with the pin and the radially extending lever without being obstructed by said intermediate member.

2. A means for transmitting information from a lens barrel to a camera body as defined in claim 1 wherein said operating member in the lens barrel is a distance ring.

3. A means for transmitting information from a lens barrel to a camera body as defined in claim 2 wherein said mechanism in the camera body is a range finder.

4. A means for transmitting information from a lens barrel to a camera body as defined in claim 2 wherein said mechanism in the camera body is a flash-matic device.

5. A means for transmitting information from a lens barrel to a camera body as defined in claim 1 wherein said operating member in the lens barrel is an aperture size control ring and said mechanism in the camera body is a mechanism connected with an exposure control means.

* * * * *